(12) United States Patent
van Rossen

(10) Patent No.: US 6,251,154 B1
(45) Date of Patent: Jun. 26, 2001

(54) DUST BAG AND METHOD OF PRODUCTION

(75) Inventor: Leonard M. van Rossen, BK Bunnik (NL)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 08/318,645

(22) PCT Filed: Mar. 24, 1993

(86) PCT No.: PCT/US93/02707

§ 371 Date: Oct. 6, 1994

§ 102(e) Date: Oct. 6, 1994

(87) PCT Pub. No.: WO93/21812

PCT Pub. Date: Nov. 11, 1993

(30) Foreign Application Priority Data

May 6, 1992 (DE) .................................................. 42 14 990

(51) Int. Cl.⁷ .................................................. B01D 46/02
(52) U.S. Cl. .................. 55/382; 55/524; 55/DIG. 2; 55/DIG. 3; 55/DIG. 5; 156/199; 156/200; 156/201; 156/202; 156/203; 264/145; 264/159; 264/160; 264/171.1; 264/DIG. 48
(58) Field of Search ....................... 55/382, 524, DIG. 2, 55/DIG. 3, DIG. 5; 264/DIG. 48, 145, 159, 160, 171.1; 156/199–203

(56) References Cited

U.S. PATENT DOCUMENTS

| | | | |
|---|---|---|---|
| 2,792,076 | * | 5/1957 | Meyerhoefer ................. 55/DIG. 2 X |
| 2,848,062 | | 8/1958 | Meyerhoefer .......................... 183/51 |
| 3,094,083 | * | 6/1963 | Weeks ........................ 55/DIG. 5 X |
| 3,273,322 | * | 9/1966 | Fesco ............................ 55/DIG. 5 X |
| 3,350,857 | * | 11/1967 | Fesco ................................. 55/378 X |
| 3,370,406 | * | 2/1968 | Fesco ................................. 55/382 X |
| 3,452,520 | * | 7/1969 | Fesco ................................. 55/382 X |
| 3,479,802 | * | 11/1969 | Fesco ................................. 55/378 X |
| 3,498,031 | * | 3/1970 | Fesco ................................. 55/378 X |
| 4,125,219 | * | 11/1978 | Engen ........................ 55/DIG. 2 X |
| 4,589,894 | * | 5/1986 | Gin et al. ........................ 55/382 X |
| 5,080,702 | * | 1/1992 | Bosses ................................... 55/382 |

FOREIGN PATENT DOCUMENTS

| | | |
|---|---|---|
| 0 161 760 A2 | 11/1985 | (EP) . |
| 0 375 234 A1 | 6/1990 | (EP) ........................... B01D/39/16 |
| 1167874 | 11/1956 | (FR) . |
| 527252 | 10/1940 | (GB) . |
| 60-34423 | 8/1983 | (JP) . |
| 62-27912 | 7/1985 | (JP) . |
| 1-155954 | 10/1989 | (JP) . |

OTHER PUBLICATIONS

International Search Report.

* cited by examiner

Primary Examiner—Krisanne Thornton
(74) Attorney, Agent, or Firm—Gary L. Griswold; Robert W. Sprague; William J. Bond

(57) ABSTRACT

A dust bag comprises a filter bag consisting of a filter material. In a first wall portion of the filter bag, an inlet opening is provided through which the air flow to be cleaned gets into the filter bag. On the inner surface of the wall portion opposite the inlet opening, there lies a protective layer of a resistant material of great tensile strength. This protective layer extends as a strip through the filter bag and prevents damage to the inner surface of the filter bag caused by particles striking the same.

8 Claims, 3 Drawing Sheets

DUST BAG AND METHOD OF PRODUCTION

FIELD OF THE INVENTION

The invention relates to a dust bag, as well as to a method of producing a dust bag.

1. Background Art

In recent years, the suction performance of vacuum cleaners has increased constantly. As a result, the air flow sucked into the dust bag through the inlet opening thereof is so strong that the particles taken along in the air flow to be cleaned may damage the dust bag when impinging on the inner surface thereof. This risk of damage to the bag of the vacuum cleaner is particularly high at the inner surface of the dust bag opposite the inlet opening. Further, such dust bags are particularly prone to damages, in which the inflowing air impinges obliquely onto the inner surface of the dust bag opposite the inlet opening; in such dust bags, the inner surface portion opposite the inlet opening is blown clean by the inflowing air so that no dust or particles can gather there which could protect the inner surface from damage.

From European Patent 0 161 760 A2, a dust bag is known having a filter bag consisting of a three-layered fiber material composite. An inner layer of polypropylene micro fiber is disposed between two outer supporting layers of high strength. The two outer layers consist of a nonwoven web of nylon fibers that are welded together. These outer layers are of a relatively high strength both in the machining direction and transversally thereto. However, since this known dust bag has two fiber layers of high strength, seen over its entire wall, it is comparatively expensive to produce.

It is an object of the present invention to provide a dust bag that is protected from damage by sucked particles and may be produced at low cost.

2. Description of the Invention

The object is solved by the dust bag of the present invention having a filter bag provided with an air-permeable filter material and having two wall portions that are connected or closed at their respective opposite edges so as to form the filter bag. The inlet opening for allowing the inflow of the air to be cleaned into the filter bag is arranged in one of the two wall portions. On the inner surface of the wall portion opposite the inflow opening, a protective layer is provided that is made from an air-permeable material resistant to mechanical stresses caused by particles in the air flow and protecting the filter material of the filter bag. This protective layer extends at least over the surface portion of the other wall portion opposite the inlet opening and between at least two interconnected edges of the two wall portions, the protective layer being held between the interconnected edges over at least a part of their length. The protective layer may lie on the inner surface of the wall portion opposite the inlet opening.

The protective layer of the dust bag of the present invention is an insert positioned in the filter bag prior to the completion thereof. This insert is held on the filter bag by at least two interconnected end edges. Preferably, the insert is held at the filter bag at those of the insert's ends that are disposed between the interconnected edge portions of the wall portions of the filter bag. Each wall portion may be integral or may consist of a plurality of parts that are interconnected to constitute the respective wall portion. Advantageously, the protective layer of the present dust bag is in the form of a strip-shaped web that does not extend over the entire surface of the wall portion opposite the inlet opening, but is arranged only in the surface portion opposite the inlet opening and extends through the filter bag. The protective layer consists of air-permeable material. Preferably, the permeability to air of this material is considerably higher (for example, at least by the factor 10) than the permeability to air of the actual filter material so that the pressure drop of the dust bag is not or only insignificantly reduced.

Advantageously, the protective layer consists of a nonwoven of rigidly connected (e.g. heat bonded) synthetic polymeric fibers and has a comparatively high strength, though being light of weight. Preferably, the strength of the protective layer is greater than that of the filter material by at least the factor 2 to 3.

In a first variant of a method of production according to the present invention, the dust bag described above is made by forming a first web of air-permeable filter material. While being supplied, this first web of air-permeable filter material is shaped such that both longitudinal edges thereof are made to overlap. Together with the first web, a separate second web is supplied as a protective layer for the first web, the second web being narrower than the first one. The second web is about centered with respect to the first web. By shaping the first web, the same encloses the second web so that after connecting the overlapping longitudinal edges of the first web, a tube of filter material is obtained. In this tube, the second web is arranged as an insert, consisting of an air-permeable material resistant to mechanical stresses caused by particles in the air flow and protecting the filter material of the first web. The first web is provided with an opening which forms the (future) inlet opening which forms the (future) inlet opening of the finished dust bag for the inflow of air to be filtered into the filter bag. The inlet opening is provided opposite the second web. After the overlapping longitudinal edges have been connected, a section of the first web thus formed is severed with the second web disposed therein. The cut off section is then sealedly closed at both open end edges, which may be done, for example, by folding and heat bonding or glueing the ends. In doing so, both longitudinal ends of the second web are held at the two closed ends of the cut off section. The insert of the invention provided for the protection of the dust bag in the area opposite the inlet opening can thus readily be integrated into the production process as a second web supplied in addition to the first web. The second web is automatically fastened to the filter material web when closing the ends of the cut off hose section of filter material containing the second material web therein. There is no need for a large surface fastening of the second web to the first filter material web, since the inflowing air presses the second web onto the inner surface of the filter bag.

Whereas, according to the above method, dust bags of in particular paper filter material are generally produced, a second variant of the method of the present invention preferably provides for the production of dust bags using a fiber layer composite as the filter material. Onto a first layer of such an air-permeable composite filter material, comprising one or more layers and synthetic, thermoplastic fibers, a second layer of a material is applied that is resistant to mechanical stresses caused by particles in the air flow to be filtered and is permeable to air. Onto this second layer, a third layer that is of the same material as the first layer is applied such that at least the edges of the first and the third layer overlap and at least two (opposing) edges of the second layer overlap opposing edges of the first and the third layer. The overlying layers are then welded together along the overlapping edges. Prior to welding and superposing the layers, an opening will be formed in the first or the third layer, the opening being opposite the second layer. By welding the described sequence of layers in order to produce the dust bag, the second layer is held between the two layers of filter material at its ends and/or its edge portions. Preferably, the second layer is narrower than the first or the third layer and extends through the dust bag only over the surface portion opposite the inlet opening.

In both methods of production, the inlet opening can also be provided in the filter bag after the same has been closed.

In its edge portions secured between the welded edges of the two filter material layers, the resistant second (intermediate) layer contributes to the strengthening of the weld seam. By welding the filter material layers together, the fibers in the area of the weld seam may become brittle due to the welding and may lose strength. The air-permeable second layer, the fibers of which preferably have a melting point higher than that of the filter material layers, strengthens the weld seam since it does not melt upon welding. The second layer acts like a matrix surrounded by the molten and solidified material. One must only see to it that the second layer is also thin and permeable enough for the material of the first and third layers that melts upon welding so that the first and third layers that melts upon welding so that the first and third layers become interconnected.

BRIEF DESCRIPTION OF THE DRAWINGS

The following is a detailed description of embodiments of the dust bag of the present invention made with reference to the drawings, in which.

DESCRIPTION OF DETAILED EMBODIMENTS

Figure 1:
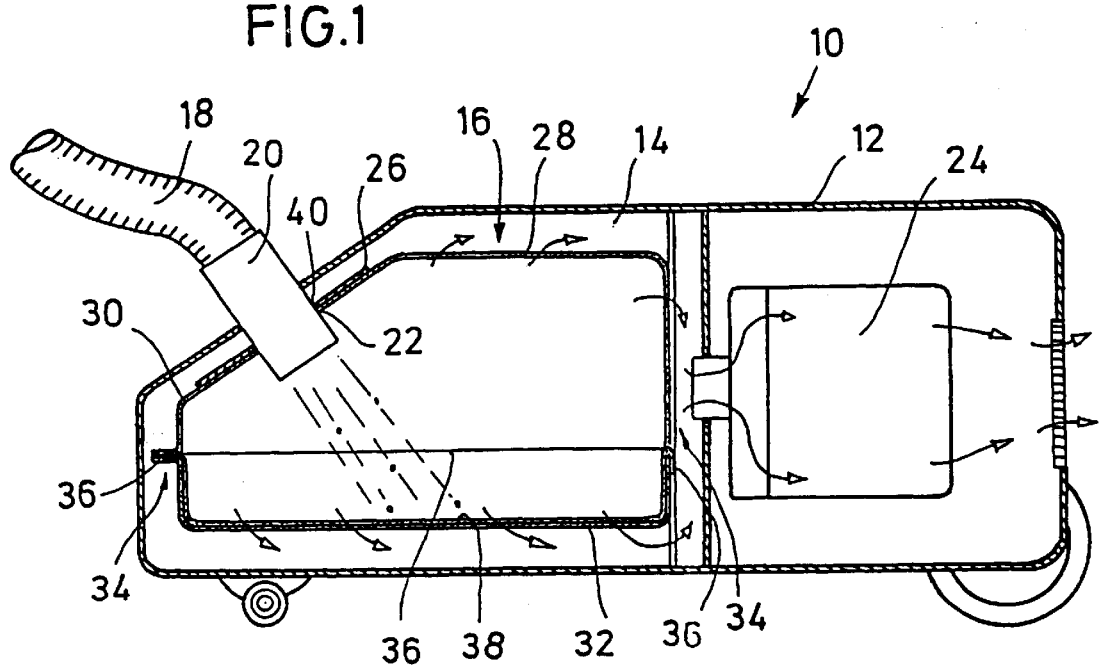
FIG. 1 is a side elevational view of a vacuum cleaner with a dust bag arranged therein.

Referring now to FIG. 1, a vacuum cleaner 10 is represented schematically in side elevational view. A chamber 14 is formed in the housing 12 of the vacuum cleaner 10, the chamber 14 accommodating a vacuum cleaner bag 16. Air is sucked into the dust bag 16 through a hose 18 having a socket 20 adapted for connection to the vacuum cleaner housing 10. The socket 20 extends through an inlet opening 22 formed in the dust bag 16. In order to generate a partial vacuum inside the dust bag 16, the vacuum cleaner 10 is provided with a fan indicated at 24. A holding plate 26 of rigid, flexurally strong material serves to hold the dust bag 16, to which it is connected, at the vacuum cleaner housing 12 in the area of the inlet opening 22.

The dust bag 16 comprises a filter bag 28 of a two-layered fiber material composite. This fiber material composite comprises a first filter layer of polypropylene fibers acting as a filter layer, and a supporting layer connected with this filter layer and also consisting of polypropylene fibers. This supporting layer has a strength that gives the filter bag 28 sufficient stability and strength during the operation of the vacuum cleaner 10 and the handling of the dust bag 16. The material used for the filter bag 28 is a filter fiber material, available from The Minnesota Mining and Manufacturing Company and specified as "SBMF". The supporting layer of the fiber material composite forms the outer layer of the filter bag 28.

The filter bag 28 has an upper wall portion 30 and a lower wall portion 32. The inlet opening 22 is formed in the upper wall portion 30. As indicated at 34 in FIG. 1, the opposing edges 36 of the two wall portions 30, 32 of the filter bag 28 are welded together (cf. also the plan view of the filter bag 28 in FIG. 2).

Figure 2:
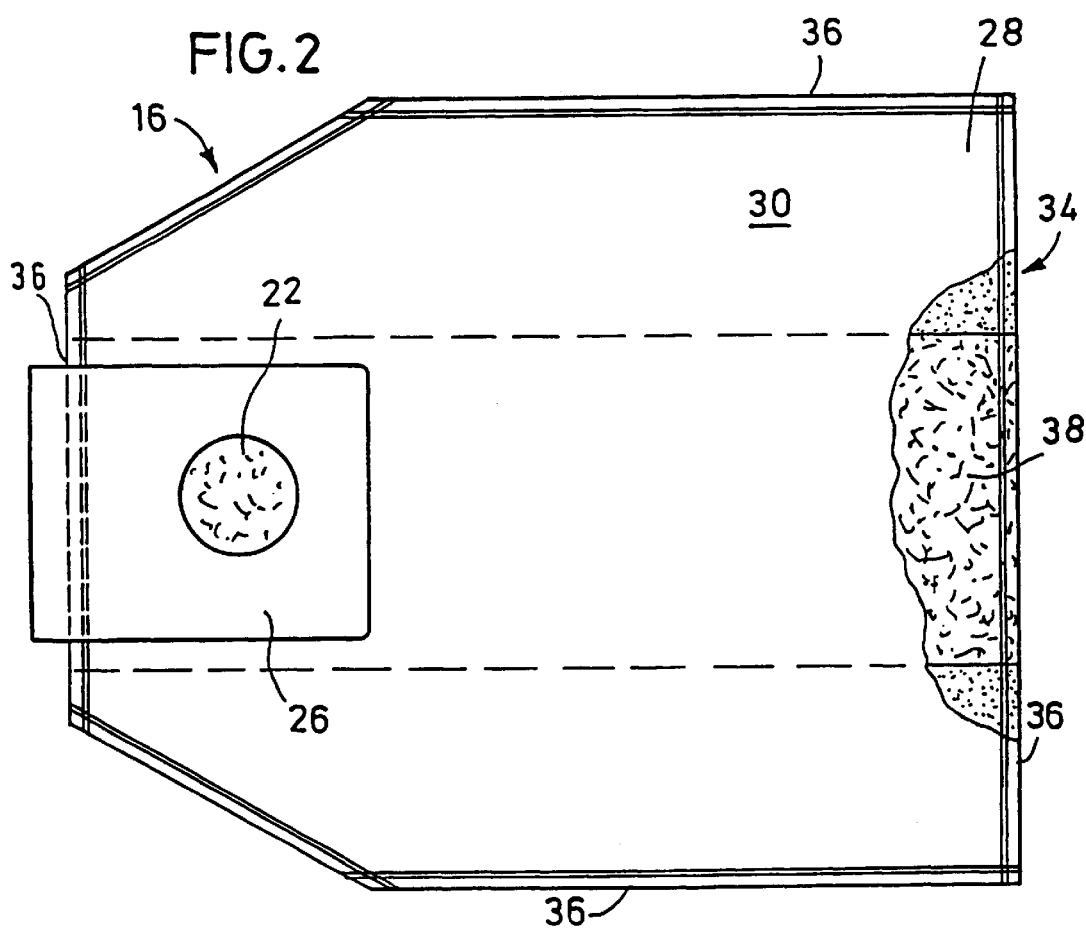
FIG. 2 is a top plan view of the dust bag of FIG. 1.

As illustrated in FIGS. 1 and 2, the filter bag 28 contains a protective layer insert 38 that loosely lies on the inner surface of the lower wall portion 32. The protective layer insert 38 extends between at least two edges 36 of the two wall portions 30, 32 between which it is held. As can be seen in FIG. 2, the protective layer insert 38 is strip-shaped and extends in the surface area of the lower wall portion 32 that is opposite the inlet opening 22. The protective layer insert 38 is made from an air-permeable and resistant non-woven of synthetic fibers. The material used for the protective layer insert is a spunbonded nylon web sold under the trademark "CEREX" and available from Fiber Web Sweden AB, Sweden. The strength of the spunbonded web of the protective layer insert 38 is considerably greater than the strength of the fiber composite material of the filter bag 28. The protective layer insert 38 protects the interior of the filter bag 28 against damage by impinging particles carried in the air flow sucked into the dust bag 16, since it is arranged opposite the inlet opening 22. The remaining inner surface area of the filter bag 28 does not have to be protected from damage by particles in the air flow because the particles do not impinge with such a high velocity on the rest of the filter bag 28. Due to the high permeability to air of the protective layer insert 38 that is considerably higher than that of the fiber composite of the filter bag 28, the fluidic properties of the dust bag 16 are not impaired.

The dust bag 16 illustrated in FIGS. 1 and 2 is produced as follows. The strip-shaped protective layer insert 38 is applied onto a first layer of fiber composite material that will form the lower wall portion 32 of the filter bag 28. The protective layer insert 38 is positioned such that the strip is arranged opposite to the inlet opening 22 to be formed later on. Subsequently, a further layer of fiber composite material that will form the upper wall portion 30, is applied onto the first layer and the protective layer insert 38. Prior to this step, the inlet opening 22 has been formed in this further layer. Then, the sequence of layers, comprising the two fiber composite layers and the interposed strip-shaped protective layer insert 38, is welded at the edges 36. The longitudinal dimension of the protective layer insert 38 is selected such that the protective layer insert 38 extends to between at least two of the interconnected welded edges 36 of the fiber composite layers of the two wall portions 30, 32. Thus, the protective layer insert 38 is held at the edges 36 of the filter bag 28. The melting temperature of the fibers of the protective layer insert 38 is higher than that of the fibers of the wall portions 30, 32. Thereby, it is achieved that the protective layer insert 38 contributes to the strengthening of the weld seam. The permeability and the thinness of the protective layer insert 38 ensures that the molten fiber material of the wall portions 30, 32 penetrates the protective layer insert 38 and becomes bonded. In a further step, the holding plate 26 is fastened to the filter bag 28 in the area of the inlet opening 22. The holding plate 26 has a hole 40 aligned with the inlet opening 22.

A sample of a dust bag of fiber composite material as produced for experimental purposes. The material used for the fiber composite was a two-layered non-woven laminate available from The Minnesota Mining and Manufacturing Company under the name "SBMF". This fiber laminate has a supporting layer consisting of a spunbonded polypropylene web with a weight of 30 g/m². The second layer, that is the filter layer, was constituted by a further fiber layer of polypropylene fibers with a weight of 40 g/m². This filter layer consists of polypropylene fibers that were blown onto the supporting layer in a molten state (so-called melt blown fibers). Details of the fiber laminate used for the filter bag 28 are given in U.S. Pat. No. 4,917,942. The protective layer insert 38 was a strip of spunbonded nylon web sold under the trademark "CEREX" and available from the Fiber Web Sweden AB, Sweden. The weight of the material used was 10 g/m². The material consisted of 100% of continuous filaments that were interconnected at each intersection. The tensile strength in the machining direction was 4.1 kg and 2.3 kg in the direction transversal thereto. The trap tear strength was 1.6 kg in the machining direction and 1.1 kg in the direction transversal thereto. The permeability to air was 6.6 m³/sec/m². The thickness of the protective layer insert 38 was 0.08 m.

Figure 3:
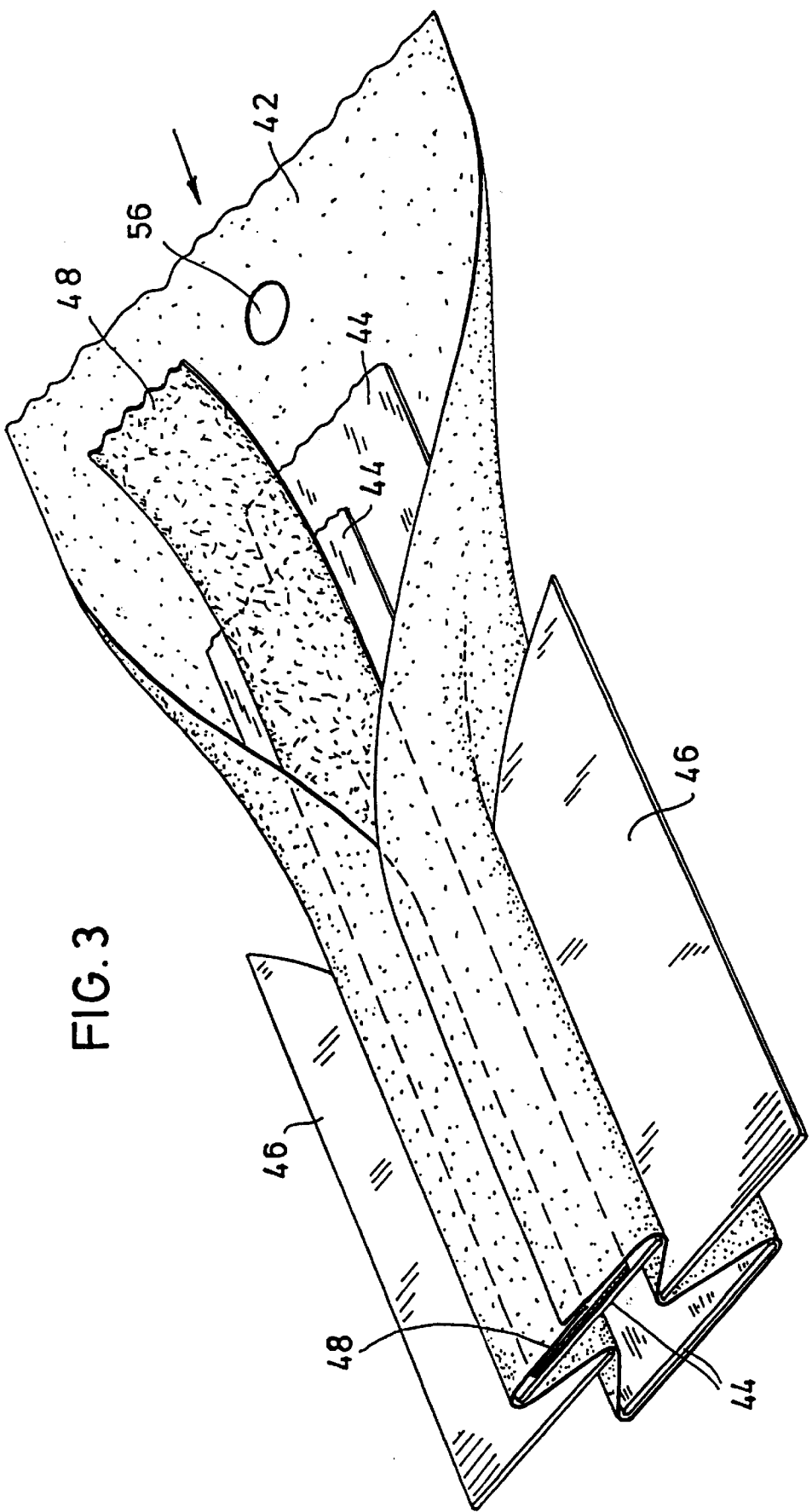
FIG. 3 is a perspective view for a better understanding of the manner of producing a paper dust bag with a protective material web therein.
Figure 4:
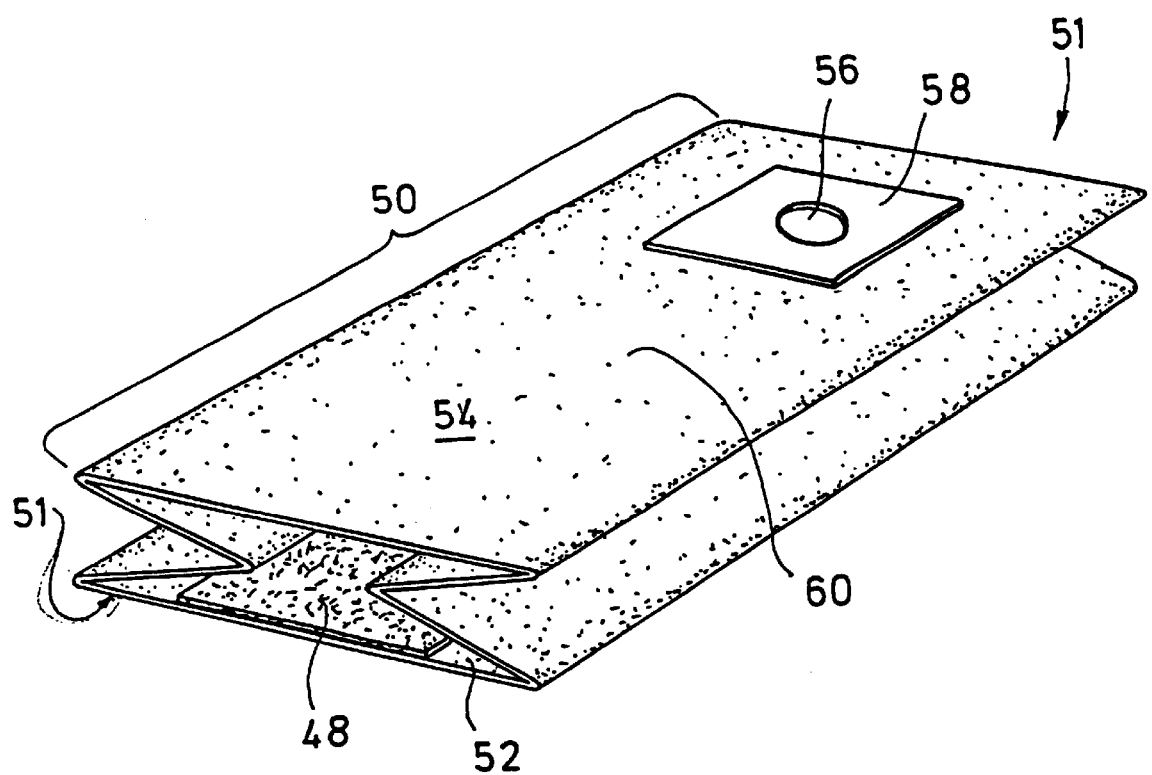
FIG. 4 is a perspective view of the paper dust bag of FIG. 3 with the ends still open.

FIGS. 3 and 4 schematically illustrate a second method of production for making a filter bag for a dust bag and the dust bag with the ends not yet closed, respectively. According to FIG. 3, a filter paper web 42 is supplied below the lower of two or more guide plates 44. The filter paper web 42, extending for about the same length beyond the longitudinal sides of the guide plates 44, is folded at the protruding edges so that it encloses the guide plates 44. When the edges of the filter paper web 42 are fully folded, they overlap so that the edges of the filter paper web 42 may be bonded by applying adhesive. Further guide plates 46, one on each longitudinal side, extend into the space between the parallel spaced guide plates 44 or two respective adjacent guide plates. These two further guide plates 46, arranged in pairs, are disposed on the same height and act to provide the filter paper web 42 laid around the guide plates 44 with two lateral folds shown in FIGS. 3 and 4, or with a plurality of lateral folds. Together with the filter paper web 42, a further web of protective material 48 is supplied. This further web 48, which is substantially narrower than the filter paper web 42, is also enclosed by the filter paper web 42. According to FIG. 3, this further web 48 can be advanced together with the filter paper web 42, the further web resting on the upper guide plate 44. It is the purpose of the protective material web 48 to protect the inner surface of the filter paper web 42 of a finished filter bag 28 against damages inflicted by particles in the air flow impinging thereon. Openings 56 that will form the inlet openings of the later filter bags are provided in the filter paper web 42 at predetermined locations. The openings 56 face the protective material web 48. A portion 50 of the filter paper web 42 formed according to FIG. 3, with the protective material web 48 enclosed therein, is severed for making a filter bag (see FIG. 4), the portion having an opening 56 therein. The filter paper web 42 thus formed has two opposite wall portions 52, 54. The wall portion 52 includes the two overlapping longitudinal edges of the filter paper web 42. The protective material web 48 lies on the inside of the wall portion 52. The opposite wall portion 54 has the inlet opening 56 provided before. A holding plate 58 is fastened to the formed filter paper web 42 so as to surround the opening 56. The protective material web 48 is positioned such that the protective material is arranged opposite the opening 56. By folding and glueing the open ends 51 of the portion 50, the same is closed at its two ends 51 so that the finished filter bag 60 is obtained. The protective material web 48 is held at the filter bag 60 at its two longitudinal ends 51. The method of production described herein could also be used with the filter material of the first method of production.

The above is a description of two embodiments of a dust bag with a protective layer for protecting the dust bag against damages by particles carried in the air flow and impinging thereon at a high velocity. The protective layer extends through the dust bag as a comparatively narrow strip in order to cover the surface area opposite the inlet opening of the dust bag. Integrating the protective layer strip into the production process of a dust bag is relatively simple and poses little problems. The material costs of a dust bag can be reduced since the protective layer is arranged only where needed. The permeability to air and the pressure drop of the dust bag are not compromised since the material of the protective layer is highly permeable to air when compared to the permeability to air of the remaining material of the filter bag.

What is claimed is:

1. A dust bag comprising:
    a filter bag having an air-permeable filter material formed of synthetic thermoplastic fibers, said filter bag having two wall portions that are connected at longitudinally opposing edges so as to form said filter bag,
    an inlet opening for allowing the air to be filtered to enter said filter bag, said inlet opening being provided in one of said wall portions, and
    a protective layer of an air-permeable nonwoven web resistant to mechanical stresses caused by particles carried in an air flow and protecting said filter material, where the fibers forming the nonwoven web are interconnected at each intersection of the fibers and are thermoplastic, which protective layer is laid on the inner surface of the other of said wall portions without bonding to said wall portions and extending at least over the surface area thereof opposite said inlet opening between at least two interconnected edges of said wall portions between which said protective layer is held,
    wherein said protective layer is in the form of a protective strip being narrower than the wall portions with longitudinal ends positioned and welded between at least the longitudinally opposing interconnected edges of said wall portions, said opposing edges defining the longitudinal dimension of said filter bag.

2. The dust bag of claim 1, wherein said protective layer is a nonwoven web of interconnected thermoplastic polymer fibers that are welded together.

3. The dust bag of claim 1, wherein said filter material is a single or multiple-layer composite with the synthetic fiber material.

4. The dust bag of claim 1, wherein said wall portions are welded together at their edges and that the melting temperature of the thermoplastic material of the protective layer fibers is higher than the melting temperature of the synthetic fiber thermoplastic filter material.

5. A method for producing a dust bag, comprising:
    providing a first web of air-permeable filter material,
    providing with the first web a second web of an air-permeable material, resistant to mechanical stresses caused by particles carried in an air flow and protecting said first web filter material, said second web being narrower than said first web,
    forming said first web such that its two longitudinal edges overlap and the first web thus formed encloses said second web,
    connecting said overlapping longitudinal edges of said first web,
    providing an opening in said first web, said opening opposing said second web, cutting off a portion of said formed first web with said second web positioned therein and having said opening, and sealing said cut off portion at both ends, said second web being held at both sealed ends of said cut off portion.

6. The method of claim 5, wherein said first web comprises a paper filter material.

7. A method for producing a dust bag, comprising: providing a first layer of air-permeable filter material and a second layer of an air-permeable material resistant to mechanical stresses caused by particles carried in an air flow to be filtered and protecting said first layer of filter material, placing said second layer on said first layer of air-permeable filter material, said second layer containing synthetic thermoplastic fibers, said second layer being narrower than said first layer, placing a third layer of an air-permeable filter material containing synthetic thermoplastic fibers on said second layer, welding this sequence of layers together along a continuous edge line, and providing an inlet opening in said first or third layer for allowing the air to be filtered to enter the filter bag formed by said first and third layers, said opening being opposite said second layer, and bonding said layers to form a dust bag.

8. The method of claim 7, wherein said second layer is narrower than said first and third layers and that said inlet opening is arranged opposite said narrow second layer.

* * * * *